United States Patent [19]

Ohishi

[11] 4,270,140
[45] May 26, 1981

[54] OPTICAL SYSTEM FOR IMPRINTING INFORMATION

[75] Inventor: Michiro Ohishi, Tokyo, Japan

[73] Assignee: Asahi Kogaku Kogyo Kabushiki Kaisha, Tokyo, Japan

[21] Appl. No.: 51,287

[22] Filed: Jun. 22, 1979

[30] Foreign Application Priority Data

Jul. 10, 1978 [JP] Japan .................................. 53-83836

[51] Int. Cl.³ ............................................ H04N 9/04
[52] U.S. Cl. ....................................................... 358/55
[58] Field of Search ..................................... 358/55, 226

[56] References Cited

U.S. PATENT DOCUMENTS

| | | | |
|---|---|---|---|
| 3,510,657 | 5/1970 | Mangiaracina et al. | 358/226 |
| 3,610,818 | 10/1971 | Bachmann | 358/55 |
| 3,905,684 | 9/1975 | Cook et al. | 358/55 |

Primary Examiner—Richard Murray
Attorney, Agent, or Firm—Sughrue, Rothwell, Mion, Zinn and Macpeak

[57] ABSTRACT

An optical system for a three or two image pick-up element type color television camera, in which an illuminating lamp, a chart on which information are provided, and a lens for projecting the image of said characters. The information on the chart is arranged outside the path of light of a photographed image and in the vicinity of a color separation prism system in such a manner that said image of information is applied as optical information to the color separation prism system. The optical information passes through the color separation prism system to form the image of the information on the image forming surface of an image pick-up element outside the color separation prism system.

8 Claims, 6 Drawing Figures

OPTICAL SYSTEM FOR IMPRINTING INFORMATION

BACKGROUND OF THE INVENTION

This invention relates to an optical system for imprinting information such as characters, numerals or marks on the photographed image of a color television camera.

Imprinting dates or characters on photographed pictures, motion picture films and television pictures is very convenient because the dates or characters can be utilized as records in putting these pictures in order.

In general, in a character imprinting device in a camera, the image of characters is projected onto the image forming surface from behind it or from the lens housing, in order to imprint the characters. However, in a camera such as television camera using an image pick-up tube or a solid image pick-up element, it is impossible to imprint characters from behind the image forming surface because of its structure.

A system in which a character imprinting device is incorporated in a lens housing is known in the art. However, this system is undesirable for a camera having interchangeable lenses for the following reasons. In such a camera, the character imprinting device must be incorporated in each of the interchangeable lenses. Furthermore, it is necessary to provide a battery on the lens side as a power source for a lamp, lighting characters to be imprinted or for light emitting diodes forming characters. Alternatively, it is necessary to an provide electrical contact at the junction between the camera body and the lens to receive electric supply from the camera body. Accordingly, the camera becomes intricate in construction and bulky in size. Furthermore, the weight and cost are necessarily increased.

The image of characters may be formed in a photographed image by providing an optical component such as a half mirror, a mirror or a prism in a photographing optical system shown in FIG. 1. However, in this case, the peripheral portions around the characters are darkened. This results in a product that is undoubtedly poor in appearance. Furthermore, in the case where imprinting characters is not carried out, that portion is shadowed dark, and the photographed image is partly vignetted. Thus, the quality of the image is poor.

This difficulty can be overcome by moving the optical component such as a mirror or a prism outside the photographing optical system when the imprinting of characters is not carried out. However, to do so, it is necessary to provide a mechanically moving component or additional components. As a result, the manufacturing cost is increased, and the camera becomes intricate in construction and bulky in size. This in turn leads to an increase in the probability of difficultly in operation and reliability. Thus, the method is undesirable.

In composing characters or the like in a television image, two cameras are used. One of the cameras photographs an object to form the television picture, while the other camera takes a picture of a chart on which characters or the like are provided. These two images are subjected to composition, or the characters or the like are imprinted electrically. However, it is difficult for an ordinary amateur to do so because the equipment is expensive and the level of technique required for operating the equipment is very high.

SUMMARY OF THE INVENTION

The use of a color separation prisms in a color television camera having a plurality of image pick-up elements is well known in the art. Accordingly, an object of this invention is to provide an optical system in which instead of a particular mirror or prism inserted in the photographing optical system, a color separation prism is employed. Some prisms or lenses are arranged outside the photographing optical system, to eliminate the above-described drawbacks, to imprint characters, numerals or marks in a television picture.

It is another object of this invention to provide an optical system for imprinting information that is reliable and easy to operate.

These and other objects of this invention are accomplished in an optical system for a three or two image pick-up element type color television camera, in which an illuminating lamp, a chart on which information are provided, together with a lens for projecting the image of said characters. The information on the chart is arranged outside the path of light of a photographed image and in the vicinity of a color separation prism system in such a manner that said image of information is applied as optical information to the color separation prism system. The optical information passes through the color separation prism system to form the image of the information on the image forming surface of an image pick-up element outside the color separation prism system.

BRIEF DESCRIPTION OF THE DRAWINGS

FIG. 1 is an explanatory diagram showing a conventional three image pick-up element type color television camera optical system for synthetically imprinting characters or the like;

DESCRIPTION OF THE PREFERRED EMBODIMENTS

Figure 1:
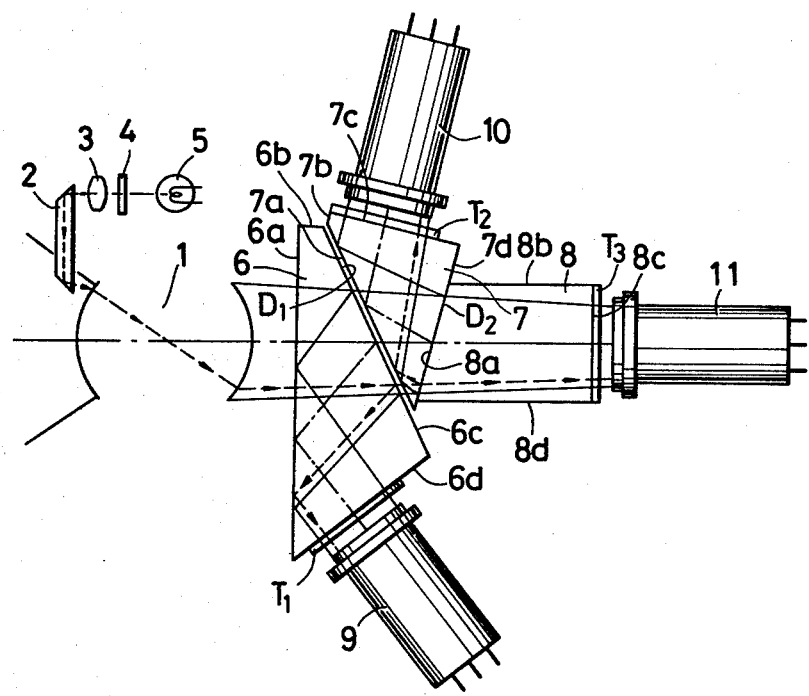
Figure 2:
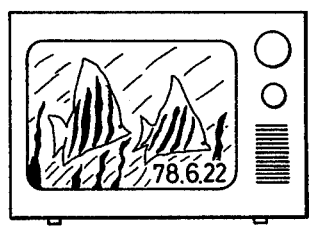
FIG. 2 is an explanatory diagram showing numerals imprinted in a television picture according to this invention.

FIG. 1 illustrates a conventional optical system in a color television camera adapted for synthetically imprinting characters or the like. A mirror or prism 2 necessary for imprinting is disposed in the optical path of a photographed image. Therefore, this method is undesirable because, as was described before, the photographed image is partly vignetted or the relevant portion is dark shadowed. Even if the mirror or prism 2 is arranged between a photographing lens 1 and prism 6, between a trimming filter $T_1$ and an image pick-up element 9, between a trimming filter $T_2$ and an image pick-up element 10, or between a trimming filter $T_3$ and an image pick-up element 11, the vignetting and shadowing phenomena occur similar as in the case of FIG. 1 in which the prism or mirror 2 is provided in front of the photographing lens 1. The remainder of the optical system shown in FIG. 1 is known in the art, and will be completely described later in conjunction with the description of the preferred embodiments.

Now, the embodiments of this invention will be described. First, an optical system shown in FIG. 3, which is a first embodiment of the invention, will be described. A prism 6 is a color separation prism system. The prism 6 has a light exit surface 6d near an image pick-up element 9, and a surface 6b in parallel with the surface 6d. The reason why the two surfaces 6b and 6d are in parallel with each other is as follows. In the case where a wedge-type prism is disposed in a convergence optical system, the image is unavoidably distorted and aberration is also made worse. Accordingly, it is impossible to imprint characters clearly.

Figure 4:
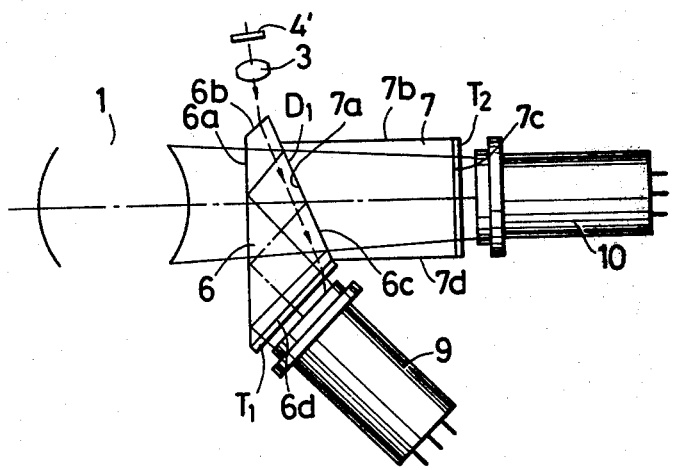
FIG. 4 is an explanatory diagram showing an optical system according to a second embodiment of the invention.

A lamp 5 irradiates a chart 4 on which characters, numerals and marks are written. The chart 4 is a film or the like which intercepts light, and the characters, etc. are written on the film or the like so that light can pass only through the characters, etc. As in a second embodiment of the invention (FIG. 4) instead of the chart 4 a light emitting member 4' comprising light emitting diodes forming characters, numerals and marks may be used. In this case, the provision of the lamp is unnecessary. A lens 3 is provided to project the image of the chart 4 onto the image forming surface of an image pick-up element 9.

Figure 3:
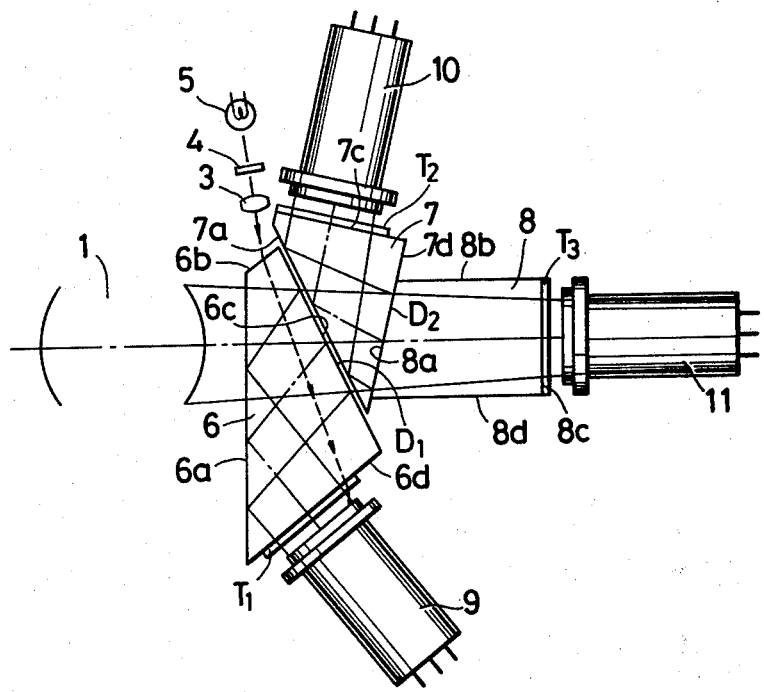
FIG. 3 is an explanatory diagram showing an optical system according to a first embodiment of the invention.

When the chart 4 is irradiated by the lamp 5, the character, numerals and marks on the chart 4 are produced as optical information. This optical information is applied to the lens 3, and then enters a prism 6 forming a part of the color separation prism through surface 6b. Then, the optical information is applied through another surface 6d opposite to the surface 6b and a trimming filter $T_1$ to the image pick-up element 9. As a result the image of the characters, numerals and marks provided on the chart 4 or formed by the light emitting diodes 4' is formed on the image forming surface of the image pick-up element 9. Even if the projecting lens 3, the chart 4 and the lamp 5 in the first embodiment according to the three image pick-up element system shown in FIG. 3 are replaced by the projecting lens 3 and the light emitting diodes 4' in the second embodiment according to the two image pick-up element system shown in FIG. 4, or vice versa, the effect of the invention is essentially maintained unchanged.

Figure 5:
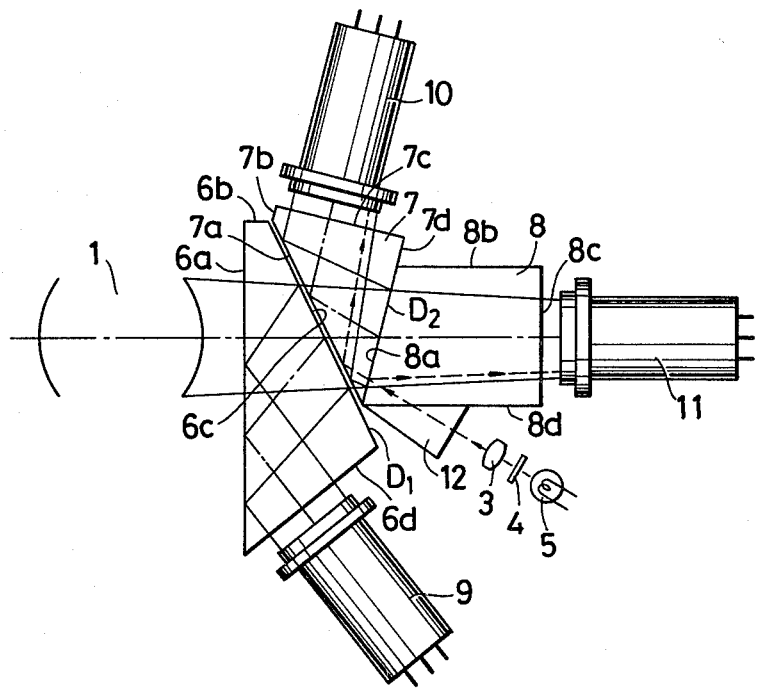
FIG. 5 is an explanatory diagram illustrating an optical system according to a third embodiment of the invention.
Figure 6:
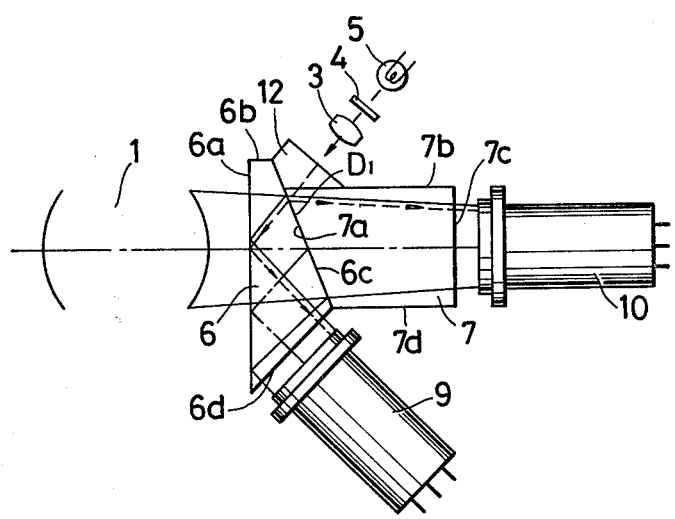
FIG. 6 is an explanatory diagram showing an optical system according to a fourth embodiment of the invention.

Third and fourth embodiments of the invention are illustrated in FIGS. 5 and 6, respectively. In these embodiments no trimming filter is disposed between the color separation prism system and the image pick-up elements. The trimming filter is eliminated for the following reasons. If a green pass trimming filter is arranged between a prism 8 and an image pick-up element 11 for red light reflection, for instance in FIG. 5, then, the red light reflected by a dichroic mirror $D_2$ is blocked by the trimming filter. That is, it does not reach the image pick-up element 11 in any significant amount. The color of light passed through the dichroic mirror $D_2$ is the complementary color of red, which is blocked by a red pass trimming filter provided between a prism 7 and an image pick-up element 10. Therefore, no image is picked up.

In the third embodiment shown in FIG. 5, light from a lamp passes through a chart 4 and leaves, as the light having the information on the chart 4, through a projecting lens 3. A prism 12 optically adheres to the surface 8d of the prism 8 forming the color separation prism system. The optical information from the lens 3 is applied to prism 12, thus entering the prism 8 through the adhesion surface 8d. Futhermore, the optical information is applied to the dichroic surface $D_2$ formed with a surface 7d forming a prism 7 and a surface 8a forming the prism 8. As a result, a part of the light being reflected thereby, passes through the prism 8 and leaves its surface 8c, to form the image on the image forming surface of the image pick-up element 11. The light passing through the dichroic surface $D_2$ leaves the surface 7c of the prism 7 to form the image on the image forming surface of the image pick-up element 10.

The above-described third embodiment shown in FIG. 5 is a three image pick-up element system. On the other hand, the fourth embodiment shown in FIG. 6 is a two image pick-up element system. In the fourth embodiment, the prism 12 optically adheres to the surface 7b of a prism 7. The lens 3, the chart 4, and the lamp 5 in each of the third and fourth examples may be replaced by the lens 3 and the light emitting diodes 4' in the second embodiment.

The optical system according to the invention has the following appreciable merits:

(1) Since the optical system has no mechanically moving components and simple inconstruction, the probability of operating trouble is substantially reduced.

(2) No optical system other than the color separation prism is provided in the path of light of a photographed image. Therefore, the image is not vignetted and the quantity of light is not decreased, in imprinting characters or the like.

(3) The photographed image is not affected even in the case when the synthetic imprinting of characters or the like is not carried out.

(4) The number of optical components to be added is small. Therefore, the optical system according to the invention can be provided at low cost.

I claim:

1. An optical system for a multiple image pick-up element type color television camera comprising; means forming an image of information indicia to be imprinted, a lens for projecting said image, said lens and said means forming an image of said information indicia arranged outside the path of light of a photographed image and in the vicinity of a color separation prism system, a separation prism system for said camera having at least one dichroic reflecting layer, means for applying the image of said information indicia to be imprinted as optical information to said color separation prism system, and an image pick-up element having an image forming surface; said optical information passing through said color separation prism system along an unreflected path to said image pick-up element and forming the image of said information on the image forming surface of said image pick-up element outside said color separation prism system.

2. The optical system of claim 1 wherein said means forming an image of information to be imprinted comprises display means having information indicia thereon and a lamp for illuminating said display means.

3. The optical system of claim 1 wherein said means forming an image of information to be imprinted comprises an array of light emitting diodes forming information indicia.

4. The optical system of claims 1, 2 or 3 wherein said image pick-up element type color television camera is a two image pick-up type.

5. The optical system of claims 1, 2 or 3 wherein said image pick-up element type color television camera is a three image pick-up type.

6. The optical system of claims 1, 2 or 3 wherein said means for applying the image of said information indicia to said color separation prism system comprises a prism surface of said prism system parallel with said image forming surface.

7. The optical system of claim 6 further comprising a trimming filter interposed between said color separation prism system and said image forming surface.

8. The optical system of claim 6 wherein said color separation prism system further comprises a second prism surface parallel to said image forming surface and receiving the image of said information indicia.

* * * * *